United States Patent [19]
Butman et al.

[11] Patent Number: 6,128,645
[45] Date of Patent: *Oct. 3, 2000

[54] HYPER AND CLIENT DOMAIN SERVERS

[75] Inventors: Ronald A. Butman, Nahant; Raja Ramachandran, Allston; Thomas A. Burns, Duxbury; Thomas J. Malone, South Boston; Michael D. Kmiec, Boston; Joseph C. Dougherty, West Roxbury, all of Mass.

[73] Assignee: PFN, Inc., Cambridge, Mass.

[*] Notice: This patent is subject to a terminal disclaimer.

[21] Appl. No.: 09/241,465

[22] Filed: Feb. 1, 1999

Related U.S. Application Data

[63] Continuation of application No. 08/822,902, Mar. 24, 1997, Pat. No. 5,870,562, and a continuation of application No. 08/823,428, Mar. 24, 1997, Pat. No. 5,867,665, and a continuation of application No. 08/822,898, Mar. 24, 1997, Pat. No. 5,867,667, and a continuation of application No. 08/828,833, Mar. 24, 1997, Pat. No. 6,026,430, and a continuation of application No. 08/828,142, Mar. 24, 1997, Pat. No. 5,884,035.

[51] Int. Cl.[7] .................................................. G06F 15/16

[52] U.S. Cl. ......................................................... 709/203

[58] Field of Search ................................... 709/203, 223, 709/224, 238, 229, 227, 225, 205, 219, 217, 208; 714/4; 395/331; 370/401

[56] References Cited

U.S. PATENT DOCUMENTS

| | | | |
|---|---|---|---|
| 5,428,778 | 6/1995 | Brookes ........................................ | 707/5 |
| 5,557,798 | 9/1996 | Skeen et al. .............................. | 709/215 |
| 5,867,665 | 2/1999 | Butman et al. ........................... | 709/238 |
| 5,867,667 | 2/1999 | Butman et al. ........................... | 709/249 |
| 5,870,562 | 2/1999 | Butman et al. ........................... | 709/238 |
| 5,884,035 | 3/1999 | Butman et al. ........................... | 709/218 |

OTHER PUBLICATIONS

NCSA NCSA Firewall Policy Guide—Feb. 1996—Published on Internet.

IBM Intranet and client/server—Apr., 1996—Published on Internet.

David Strom Creating Private Intranets: Challenges and Prospects for IS—Nov. 16, 1995—Published on Internet.

CGI A Sample forma nd its CGI script Common Gateway Interface, No date.

D.R.T. Robinson The WWW Common Gateway Interface Version 1.1—Feb. 15, 1996—Published on Internet.

Russell Owen ROFM, a Filemaker Pro CGI—Jul. 8, 1996—Published on Internet.

Andy Oram Introducing "CGI Programming on the Web"—Published on Internet, No date.

seriver Server Push Animation—Feb. 17, 1996—Published on Internet.

William Graziadei Decoding Forms with CGI—1995—Published on Internet.

Internet Technologies The Intranet–Revolution or Evolution?—Apr. 21, 1996—Published on Internet.

Darrin Nelson, Lotus Lotus Notes and the Internet Compared and Contrasted Draft—Dec. 1, 1995—Published on Internet.

Netscape Communications Intranets Redefine Corporate Information Systems—1996—Published on Internet.

Extra Corp EXTRAnet—Oct. 23, 1996—Published on Internet.

John Wack Packet Filtering Firewall—Feb. 9, 1995—Published on Internet.

(List continued on next page.)

*Primary Examiner*—Mehmet B. Geckil
*Attorney, Agent, or Firm*—Maureen Stretch

[57] ABSTRACT

A hyper domain server which maps a plurality of client domain servers into a communications infrastructure to create a community over one or more networks. In one embodiment the client domain servers map a plurality of client side communications servers within a client entity.

1 Claim, 11 Drawing Sheets-

OTHER PUBLICATIONS

TCP/IP Networking for the Internet or an Intranet, No date.
Borderware The BorderWare Firewall Server 4.0 White Paper Version 1.0—Nov. 1996—Published on Internet.
iCat (Innergy Inc.) The Intranet FAQ—Oct. 31, 1996—Published on Internet.
MPI Illustra Advantages for WWW Applications—Dec. 21, 1995—Published on Internet.
Web–Star WebStar/SSL Security Toolkit—Published on Internet.
MacDNS Macintosh Domain Name Server Frequently Asked Questions—Oct. 28, 1996—Published on Internet.
MacWeek Special Report Macweek Guide to Intranets—Aug. 5, 1996, vol. 10, No. 30—Published on Internet.
Lee Levitt Internet Technologies Deployed Behind the Firewall for Corporate Productivity Prepared for the Internet Society INET'96 Annual Meeting—Published on Internet.
Steven E. Newton What is TCP/IP?—Jan. 20, 1994—Published on Internet.
Yahoo! Intranet Bookmarks—1994-1996—Published on Internet
Netscape's Secure Sockets Layer (SSL), No date.
Michael Sarkin, PC Week Labs Review Introducing the Compaq Professional Workstation, "Security" Err on the side of caution when considering Internet connections—Oct. 30, 1995—Published on Internet.
Peter Hinxman, University of Wales Getting the most out of TCP_wrapper—Nov., 1994—Published on Internet.
America Online AOL Server: A Server Comparison; Examples; Categories—1996—Published on Internet.
network MCI WebMaker NetworkMCI WebMaker Security Brief, Overview of the networkMCI Webmaker—Published on Internet, No date.
Matt Kramer, PC Week Tech View Lab LDAP seeks to solve directory confusion—May 23, 1996—Published on Internet.
Cisco Systems Inc. Designing Large–Scale IP Internetworks—1998-1996—Published on Internet.
Steven Adler, Richard Sand Internet Insurance: Property, Contents, and Commerce A White Paper, IBM—1996—Published on Internet.
Goscinny–Uderzo Firewalls, adapted from the document "Internet Firewalls FAQ"—1991—Published on Internet.
Center for Technology in Government Internet Security Seminar, Center for Technology in Government, University of Albany—Apr. 2, 1996—Published on Internet.
Ir. Rob Koreman A Discussion of Security Rules for the use of Internet and the Web, a lecture within the 1995–1996 UIA Post–academic Program, Telecommunications and Telematica—Mar., 1996—Published on Internet.
Tina Darmohray, Marcus Ranum Firewalls—1995—Published on Internet.
W. Yeong, T. Howes, S.Kille Network Working Group Request for Comments: 1487—Jul., 1993.
Tobin Anthony Building and Maintaining an Intranet with the Macintosh, pp. 304–309, Hayden Books, No date.
Jerry Ablan, Scott Yanoff Web Site Administrator's Survival Guide, pp. 221–226, Sams Nets Publishing, No date.
Lisa Pyle Creating Lotus Notes Applications, Table 2.1, pp. 20–25—1994, Que Corporation.
Lisa Pyle Creating Lotus Notes Applications, Our Case Study Continues: Extending the Automation Capabilities, pp. 274–294—1994, Que Corporation.
Lisa Pyle Creating Lotus Notes Applications, Query Sharing, pp. 348–359—1994, Que Corporation.
Zahir Ebrahim A Brief Tutorial on ATM—Mar. 5, 1992—Published on Internet.
Michael Robin The Medium Is The Web—1996—Published on Internet.
Erica Roberts, Data Communications Getting the Goods on SNA Gateways—May 1996—Published on Internet.
Peter Heywood, To Chee Eng, Data Communications Global Supernets: Big Piper, Big Promises . . . and One Big Problem—Sep. 21, 1995—Published on Internet.
Ernst & Young Health Care Cybervision, Internet Primer—1996—Published on Internet.
David Willis State of the WAN—Apr. 15, 1996—Published on Internet.
Stephanie Wilkinson Boundless Bandwidth—May 14, 1996—PCWeek Online—Published on Internet.
ClarkNet Business Solutions Point to ISDN service—Published on Internet, No date.
Kelly Jackson Higgins Intranet Virtual Realities—1996—Published on Internet.
Isis Distributed Systems Ensuring Application Availability is a Mission Critical Function—Published on Internet, No date.
William Robertson IP Multicast and MBONE Services on the Berkeley Campus Network—Mar. 7, 1996—Published on Internet.
Tibco, Inc. MTP: Multicast Transport Protocol—1994-1996—Published on Internet.
Tibco, Inc. TIBCO Named by IDC as Largest Message–Oriented Middleware Vendor—Sep. 17, 1996—Published on Internet.
Marc Andreesen and the Netscape Product Team The Netscape Intranet Vision and Product Roadmap—Version 1.0, revised June 11, 1996—Published on Internet.
Netscape Netscape and Oracle Sign Strategic Agreement to Integrate and Distribute Flagship Products—Published on Internet, No date.

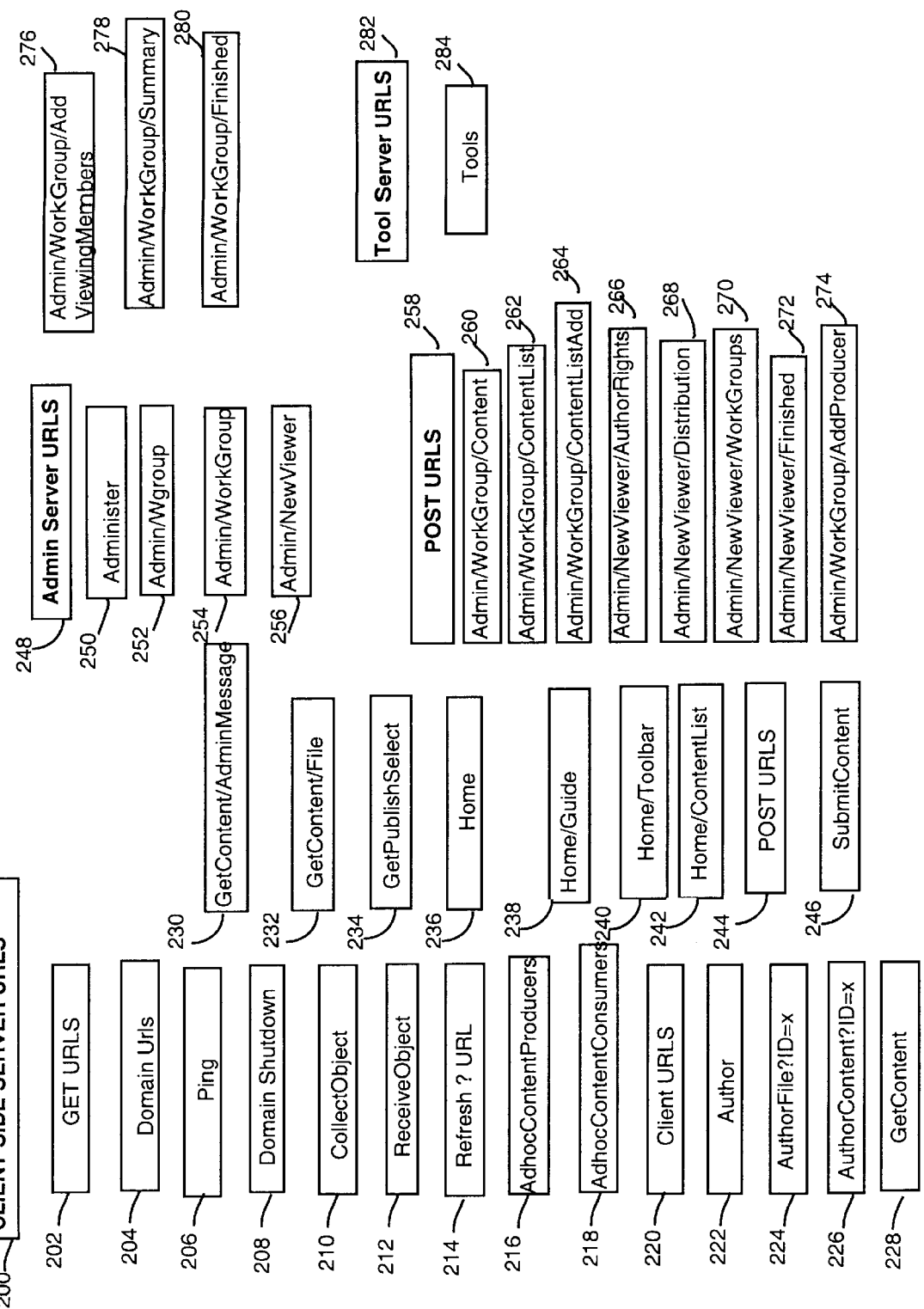

HYPER AND CLIENT DOMAIN SERVERS

This is a Continuation of application Ser. No. 08/822,902, filed on Mar. 24, 1997 now U.S. Pat. No. 5,870,562, filed Mar. 24, 1997 by Butman et al., entitled Universal Domain Routing And Publication Control System, and Ser. No. 08/823,428 now U.S. Pat. No. 5,867,665, filed Mar. 24, 1997, by Butman et al., entitled Domain Communications Server, and Ser. No. 08/822,898 now U.S. Pat. No. 5,867,667, filed Mar. 24, 1997 by Butman et al., entitled Publication Network Control System Using Domain and Client Side Communications Resource Locator Lists for Managing Information Communications Between the Domain Server and Publication Servers, and application Ser. No. 08/828,833, filed Mar. 24, 1997, now U.S. Pat. No. 6,026,430, by Butman et al., entitled Dynamic Client Registry Apparatus And Method, and Ser. No. 08/828,142 now U.S. Pat. No. 5,884,035, filed Mar. 24, 1997, by Butman et al., entitled Dynamic Distributed Group Registry Apparatus and Method For Collaboration and Selective Sharing Of Information.

BACKGROUND OF THE INVENTION

1. Field of the Invention

This invention relates generally to the field of networking computer systems and more particularly to the field of systems for providing control over distribution, redistribution, access security, filtering, organizing and display of information across disparate networks.

2. Background

In most industries and professions today there is a rapidly increasing need for intercompany as well as intracompany communications. Most companies, firms, and institutions want to allow their employees to communicate internally, with other employees, and externally with the firm's customers, vendors, information sources, and others throughout a work day. Depending on the nature of the information and the relationship between the parties, these communications may need to take the form of one-to-one communiques in some cases, one-to-many broadcasts in others, many to many communications, and even many-to-one communications. Some of these categories might also provide better information for all concerned if the flow of data is interactive and collaborative, allowing recipients to comment, share, and build upon what has already been received.

Most large private networks are built of complex sets of:

Local Area Networks (LAN)—a set of computers located within a fairly small physical area, usually less than 2 miles, and linked to each other by high speed cables or other connections; and Wide Area Networks (WAN)—groups of Local Area Networks that are linked to each other over high speed long distance communications lines or satellites that convey data quickly over long distances, forming the "backbone" of the internal network.

These private internal networks use complex hardware and software to transmit, route, and receive messages internally.

Sharing and distributing information inside a corporate network has been made somewhat easier by using client/server technology, web browsers, and hypertext technology used in the Internet, on an internal basis, as the first steps towards creating "intranets." In typical client/server technology, one computer acts as the "back end" or server to perform complex tasks for the users, while other, smaller computers or terminals are the "front-end" or "clients" that communicate with the user. In a client/server approach the client requests data from the server. A web server is a program that acts as a server function for hypertext information. In large private networks, a server computer might have web server software operating on it to handle hypertext communications within the company's internal network. At the web server site, one or more people would create documents in hypertext format and make them available at the server. In many companies, employees would have personal computers at their desks connected to the internal network. In an "intranet" these employees would use a web browser on their personal computers to see what hypertext documents are available at the web server. While this has been an advance for internal communications over a private network, it requires personnel familiar with HyperText Markup Language (HTML) the language that is used to create hypertext links in documents to create and maintain the "internal" web pages. If a more interactive approach is desired, an Information Technology (IT) specialist in some form of scripting, such as CGI, PERL, is needed who can create forms documents and procedures to allow users to ask for information from the server.

It is now increasingly common for intranets to connect to the Internet forming what is sometimes called an "extranet." The Internet, however, is essentially a passive transmission system. There is no automatic notification sent to clients or customers that a new report is available on a given Internet Web page that is external to the client's intranet. Customers or clients normally would have to search the Internet periodically to see if a Web page has changed, and if the change is something he or she is interested in seeing. Some Web page sites that provide fee services use e-mail to notify prospective users that the new data is available. As mentioned, e-mail is slow, so if the data is also time-sensitive, the notification may not reach the customer until later in the day, when it may be of much less value.

As FIG. 2a illustrates, connecting consumers of information over the Internet to external information sources via DMZ's and secure sockets is complex and cumbersome, as well as costly to set up and administer for the publishers of information. From the viewpoint of the consumers of information over the Internet it should be noted that transmissions over such a distribution model occur at "Internet speed." That is to say, once a request for information leaves customer C8, for example, if it goes over the Internet it is in TCP-IP formatted packets, and possibly encrypted via secure socket technology. In any case, its speed is the average speed of the Internet transmission links, once it leaves customer C8's backbone network. This is usually much slower than the speed of transmission within the customer's own internal network. Thus, performance speed of the intercompany communications can be problematic as well, when seen from the consumer's viewpoint.

While the use of Demilitarized Zones (DMZ's) (as described in the background of the above referenced co-pending application serial numbers:

co-pending application Ser. No. 08/822,902, filed Mar. 24, 1997 by Butman et al., entitled Universal Domain Routing And Publication Control System, and co-pending application Ser. No. 08/823,428, filed Mar. 24, 1997, by Butman et al., entitled Domain Communications Server Apparatus And Method, and co-pending application Ser. No. 08/822,898, filed Mar. 24, 1997 by Butman et al., entitled Client Side Communications Server Apparatus And Method, and co-pending application Ser. No. 08/828,833, filed Mar. 24, 1997, by Butman et al., entitled Dynamic Client Registry Apparatus And Method, and co-pending application Ser. No. 08/828,142, filed Mar. 24, 1997, by Butman et al., entitled Dynamic Group Registry Apparatus And Method.) or devices such as proxy servers help ameliorate the security problems, DMZ's also tend to create content backlogs that form bottlenecks for all intercompany communications. For example, if the only persons authorized to transfer data outside the company's firewall to its DMZ are the information technology specialists, this can become a labor intensive chore or a bottleneck or both for a company that needs or wants to send a high volume of information outside selectively. Similarly, present security technology provides various encryption options (thus creating problems for standardization amongst companies) but leaves such matters as identification up to the information technology (IT) department at each company to manage. The IT specialists must assign user identifiers and passwords to every external individual authorized to access information (authentication) in the company's DMZ. Presently this is usually done by manual letters of reference and manual data entry of each business and individual.

If, as mentioned, documents must be created using HTML, or special CGI (common gateway interface) scripts also need to be created and maintained to put data into the proper formats, all of this tends to place matters of policy and content management in the hands of IT department specialists, rather than in the hands of authors and viewers of information. IT specialists within companies are being overwhelmed by requests to add new users and individuals, administer the types of data that can be transmitted and create maintain changes and updates to the scripts, programs, networks and systems as a whole.

It is an object of this invention to provide a system and method for multiple levels of dynamic domain routing.

SUMMARY OF THE INVENTION

This is achieved by a hyper domain server which maps a plurality of client domain servers into a communications infrastructure to create a community over one or more IP protocol networks. In one embodiment the client domain servers map a plurality of client side communications servers within a client entity.

It is an aspect of this invention that it provides several options for balancing workload in a network infrastructure.

It is another aspect of the present invention that is provides more options for managing and controlling both internal and external resources in a network infrastructure.

BRIEF DESCRIPTION OF THE DRAWINGS

FIG. 6c is a block diagram of uniform resource locators (URL's) for a client side communications server.

DETAILED DESCRIPTION OF THE INVENTION

The above-referenced Co-Pending Applications, specifically incorporated by reference herein, generally describe a system and method for creating and operating domain communications servers and client side communications servers to create a communications infrastructure for dynamically routing various types of information over one or more networks. In each of the Co-Pending applications, it was noted that different domains could also be linked to each other by having a hyper or super domain communications server that maps a community of domain communications servers together. Similarly, each of the above Co-Pending applications noted that the domain routing described therein can also be used internally to create additional domain communications servers hereinafter referred to as client domain servers to offload workloads from each other in large internal networks.

Figure 1A:
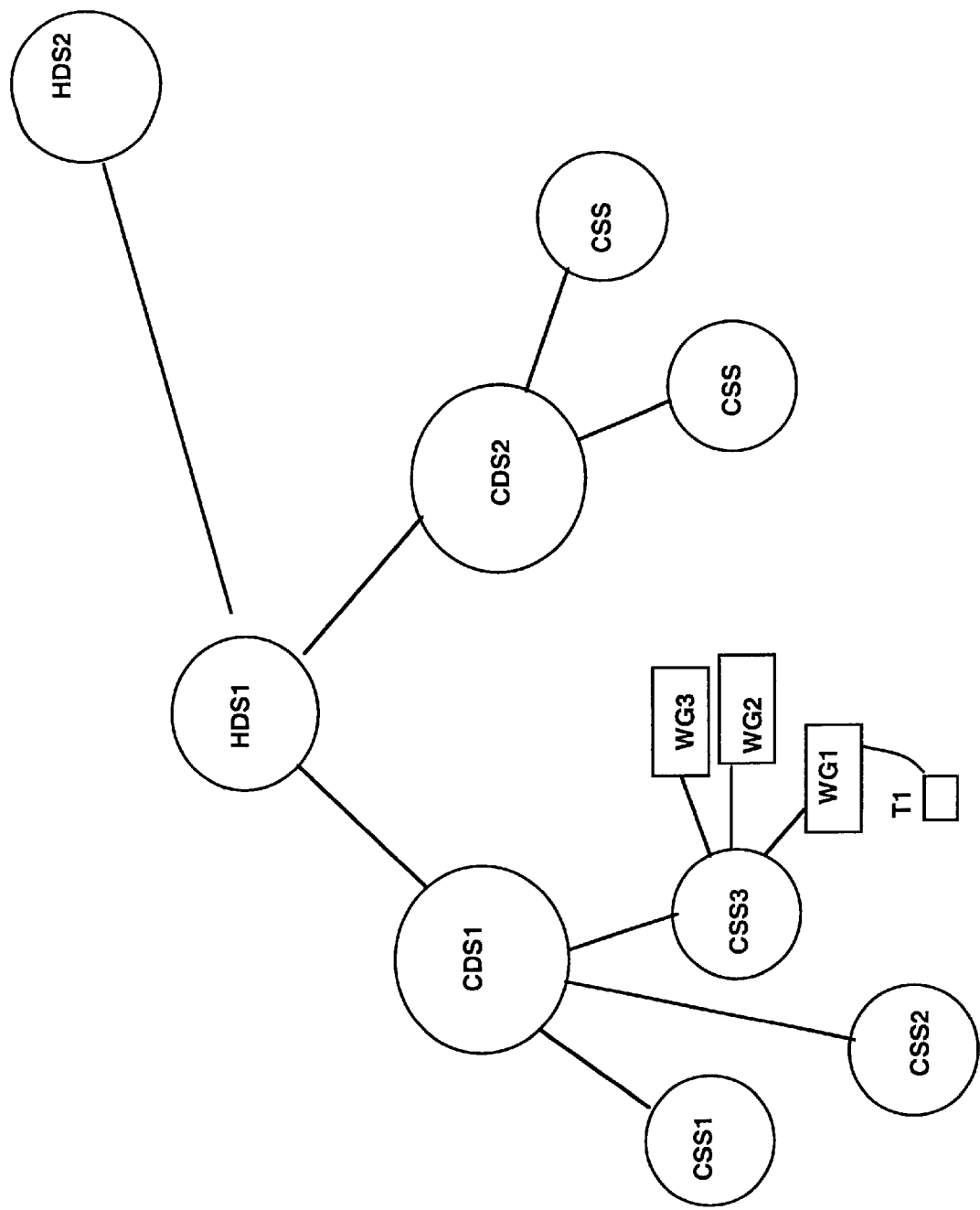
FIG. 1a shows a schematic diagram of the present invention showing hyper domain servers and several client domain servers.

This embodiment is depicted herein in FIG. 1a, which shows a hyper domain server HDS1, in communication with client domain servers CDS1 and CDS2. Client domain server CDS1 is also shown in communications with client side communications servers CSS1–CSS3. Client side communications server CSS3 is shown in communication with workgroups WG1–WG3 and WG3 is shown with at least one terminal T1 in communication with it.

In this example, as mentioned in the Co-pending parent applications referenced above, a hyper domain server HDS1 establishes a communications infrastructure between client domain servers—CDS1 and CDS2, here.

In this example, of FIG. 1a, hyper domain server HDS1 might link several investment banking domains, such as client domain server CDS1 at one bank and client domain server CDS2 at another bank. Hyper domain server HDS1, in turn might be linked into a series of larger domains, such as financial institutions HDS2, in general. Alternatively, hyper domain server HDS1 could also act as a gateway to other domains that are not normally related. For example, if hyper domain server HDS1 connects clients in the financial industry, hyper domain server HDS2 might connect client domain servers in the computer industry.

Figure 1B:
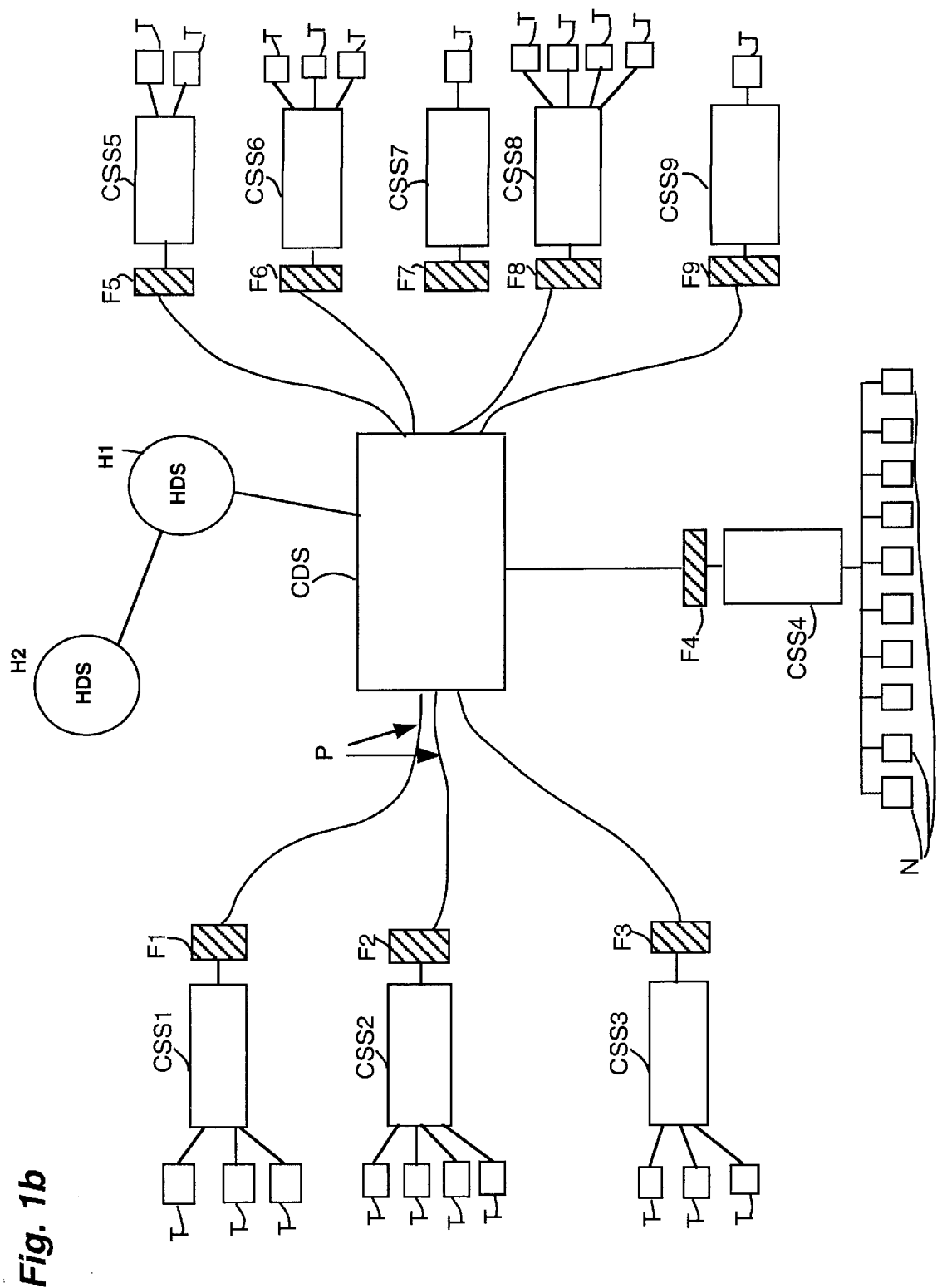
FIG. 1b is a more detailed schematic diagram of the present invention showing connections of hyper domain servers, a client domain server and several client side communications servers.

With reference now to FIG. 1b, an example of a client domain server of the present invention is shown. In this example, client domain server CDS includes the domain routing functions of a domain communications server, as described in the Co-pending applications. This allows client domain server CDS to provide a better workload balance for all the various client side communications servers CSS1–CSSO which client domain server CDS maps into a network infrastructure. In this embodiment, client domain server CDS is mapped into a hyper domain server HDS H1. Hyper domain server HDS H1 in this example might be an investment banking community.

Figure 1C:
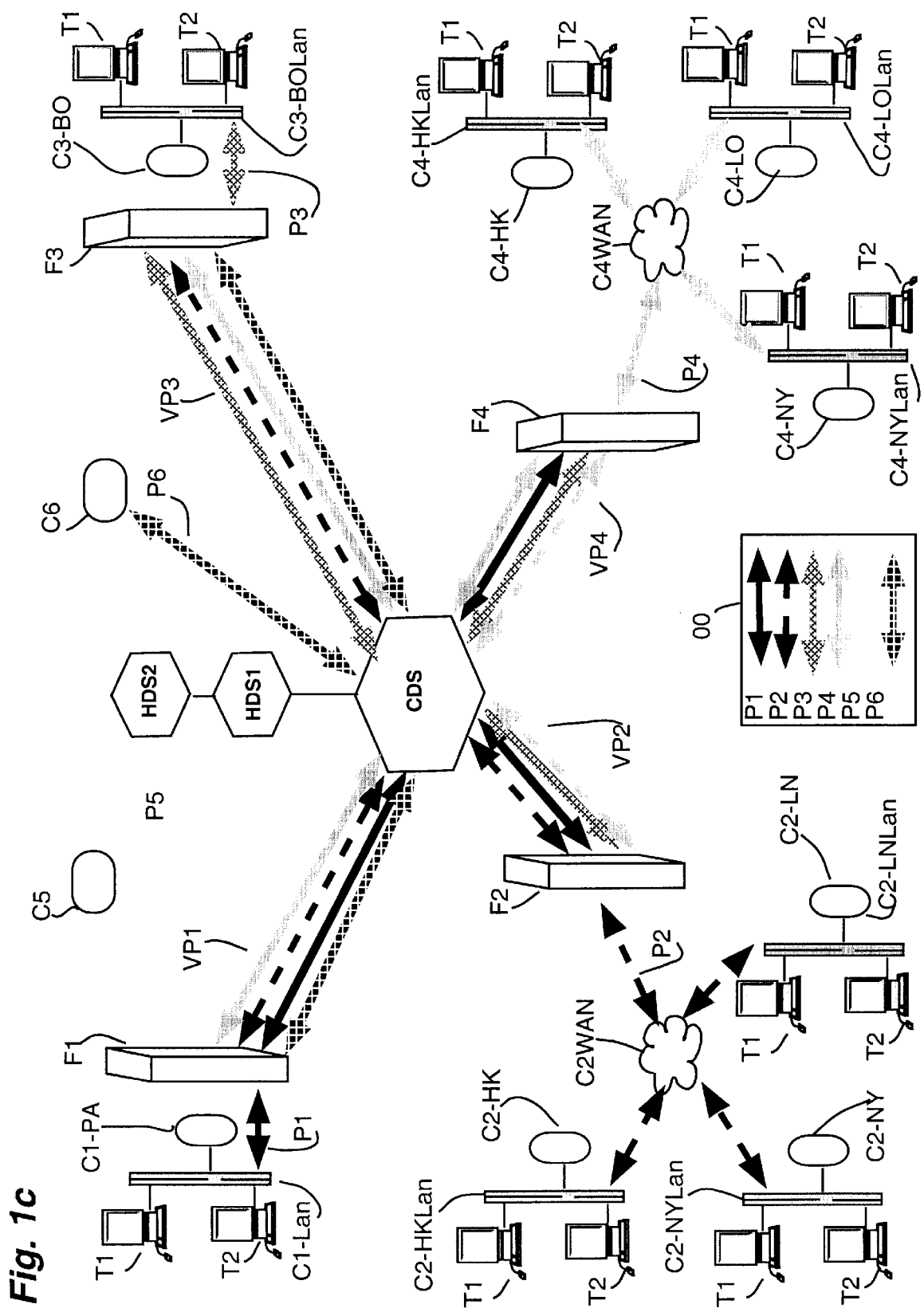
FIG. 1c is a schematic diagram of the present invention showing virtual connections within a client domain server.
Figure 2A:
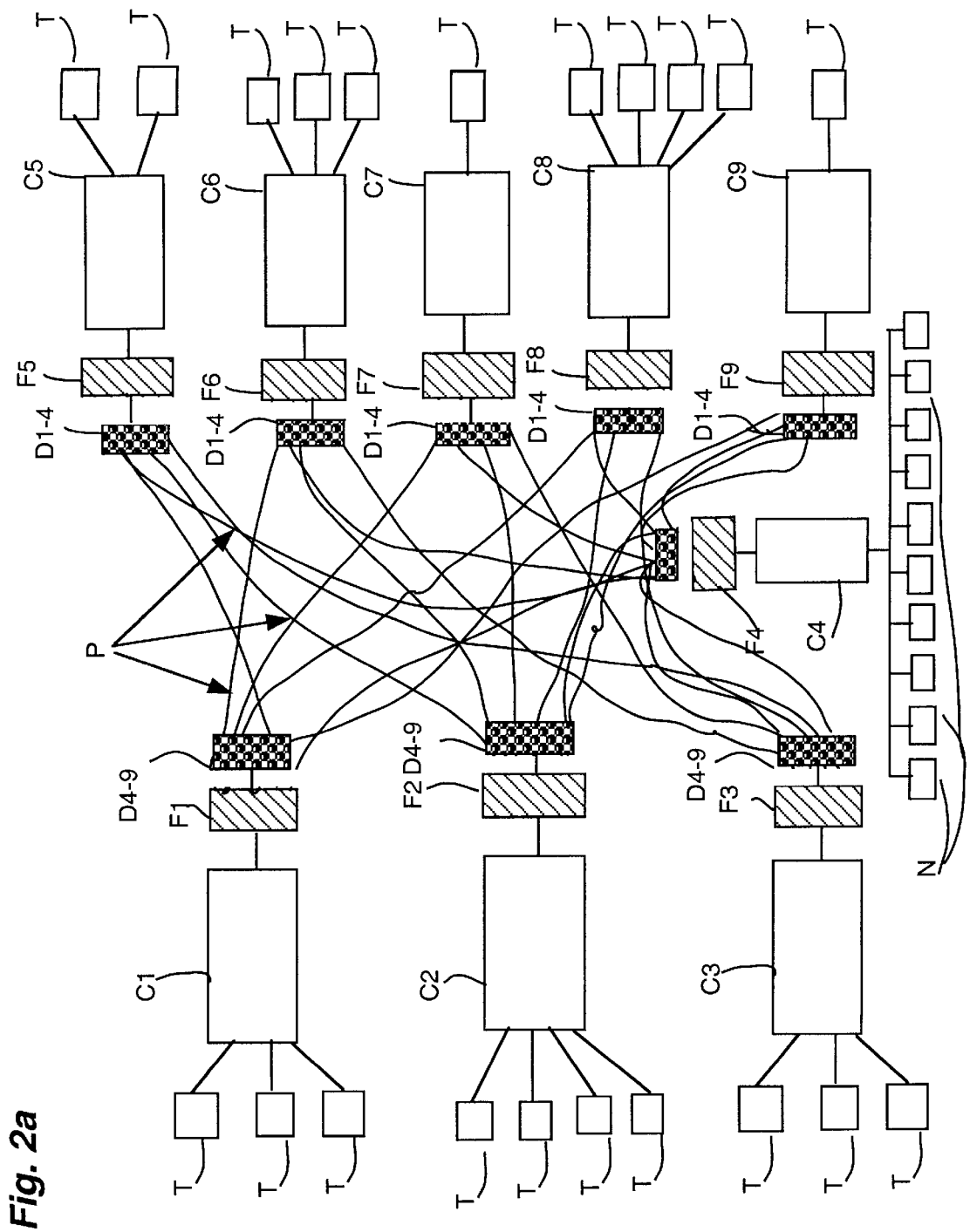
FIG. 2a is a schematic diagram of private networks communicating externally over the Internet using prior art.
Figure 2B:
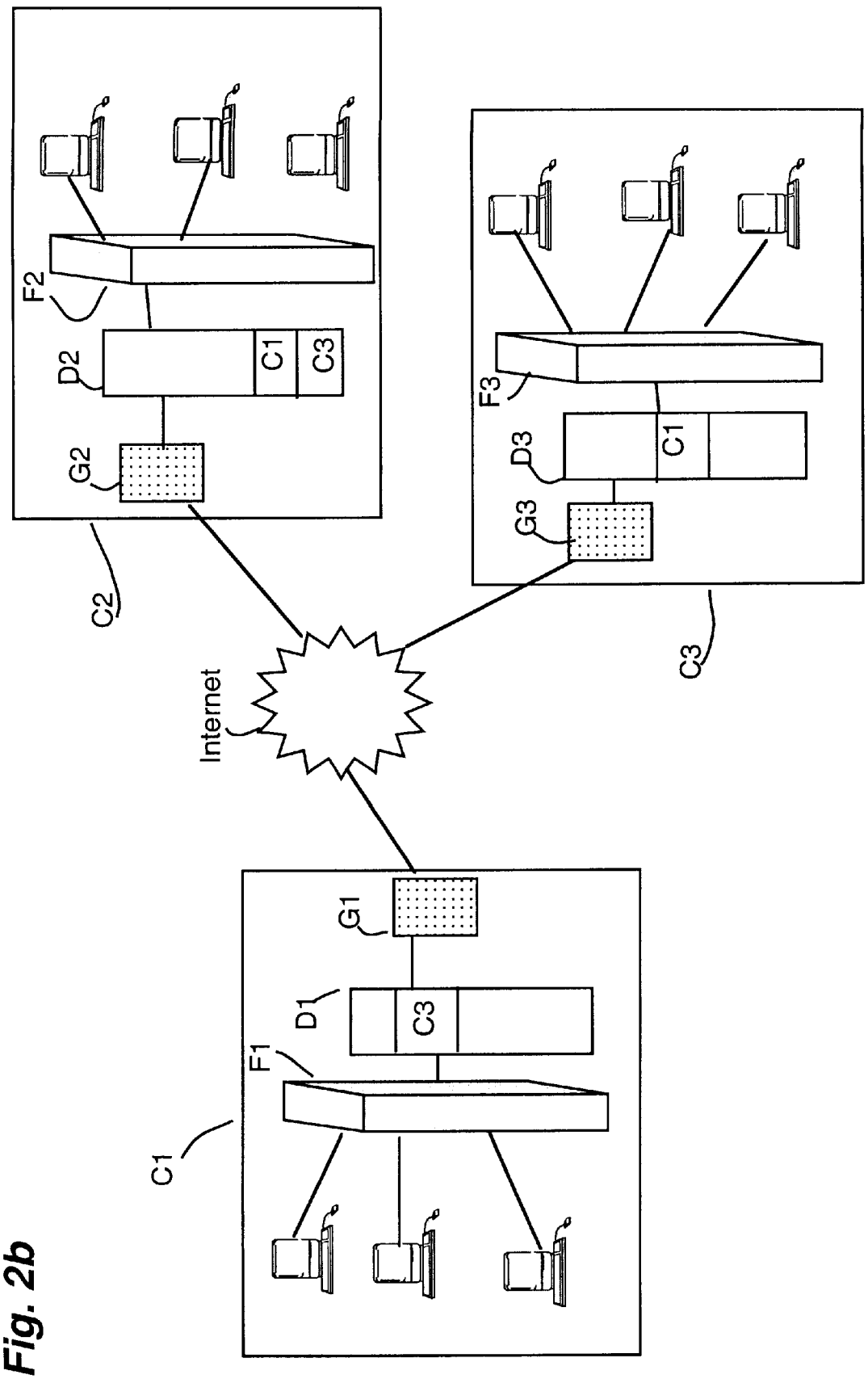
FIG. 2b is a schematic diagram of private networks communication externally over the Internet using prior art.

FIG. 1c is adapted from the above-referenced Co-pending applications and shows the virtual connections as they might exist with the use of a hyper domain server HDS1 and client domain server CDS.

Figure 3:
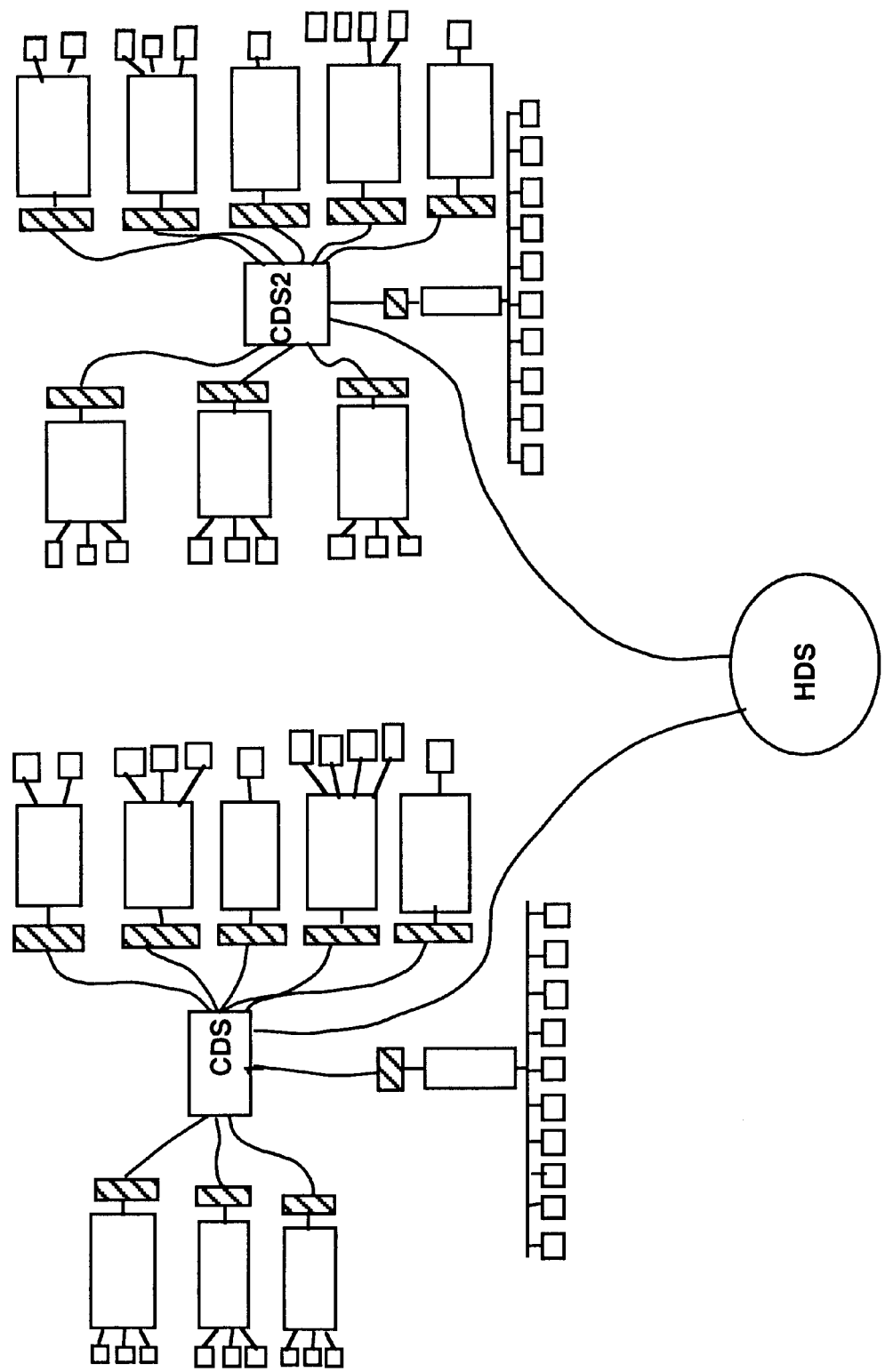
FIG. 3 is a schematic diagram of the present invention showing a hyper domain server in communication with a client domain.
Figure 4:
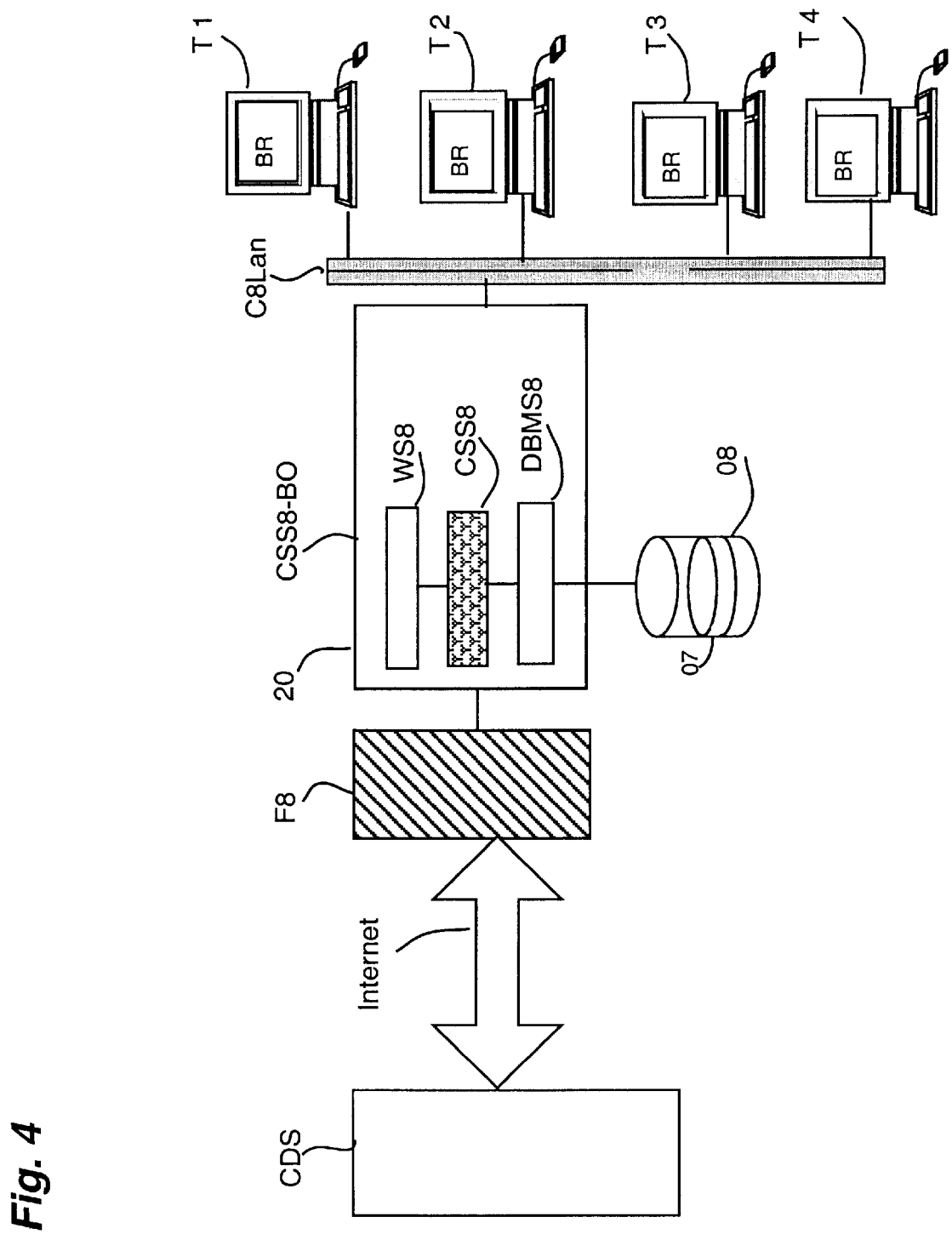
FIG. 4 is a schematic diagram of a client domain server in communication with a client side communications serve.
Figure 5:
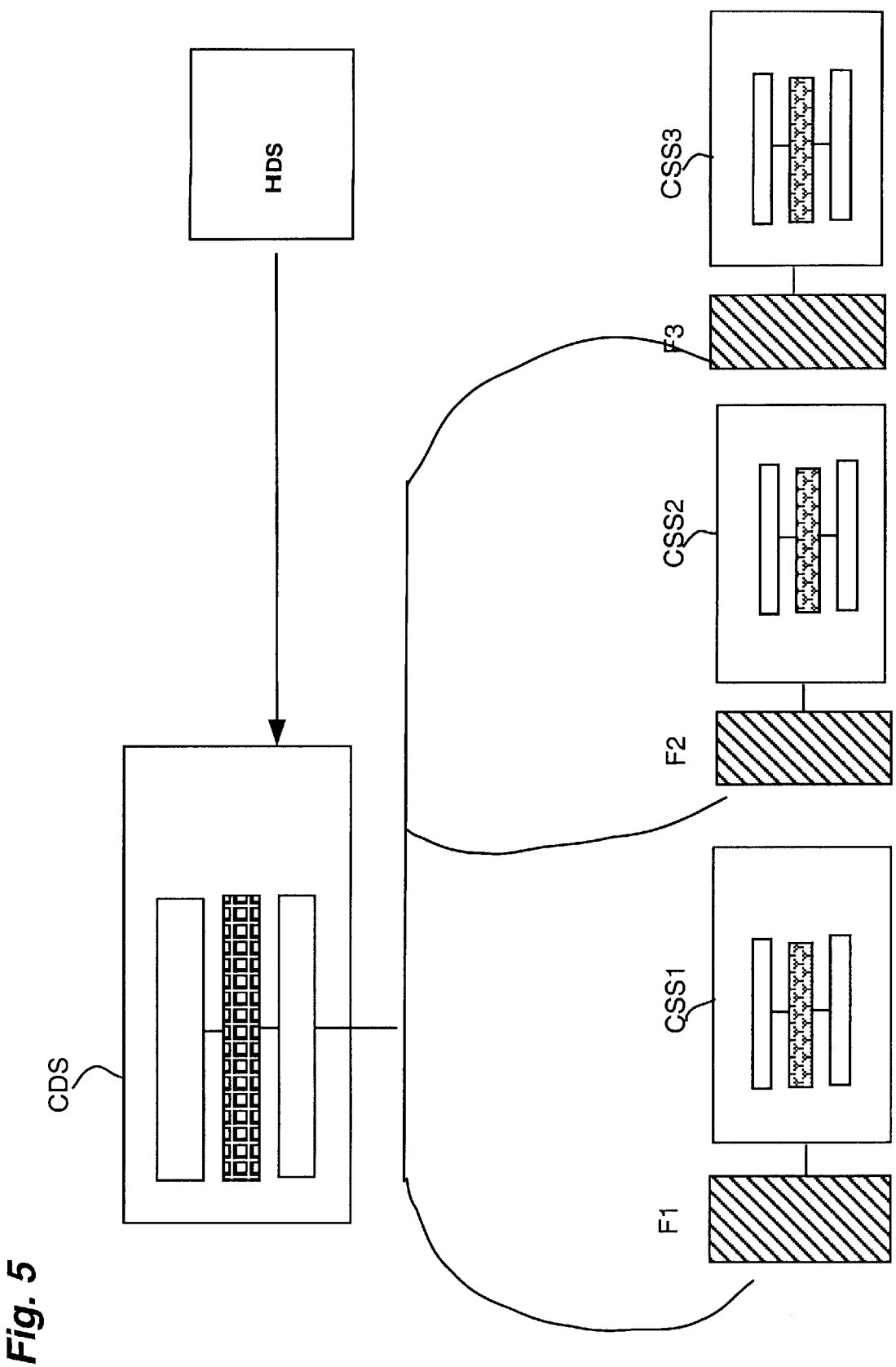
FIG. 5 is a schematic diagram illustrating interconnections between a hyper domain server, a client domain server and client side communications servers.

With reference now to FIG. 3, a hyper domain server HDS is shown mapping a communications infrastructure between two different firm client domain servers, CDS and CDS2.

While the Co-pending parent applications depict uniform resource locators for a domain communications server and a client side communications server, in this embodiment the URL functions remain essentially the same, but they are organized into three types of URL lists.

Figure 6A:
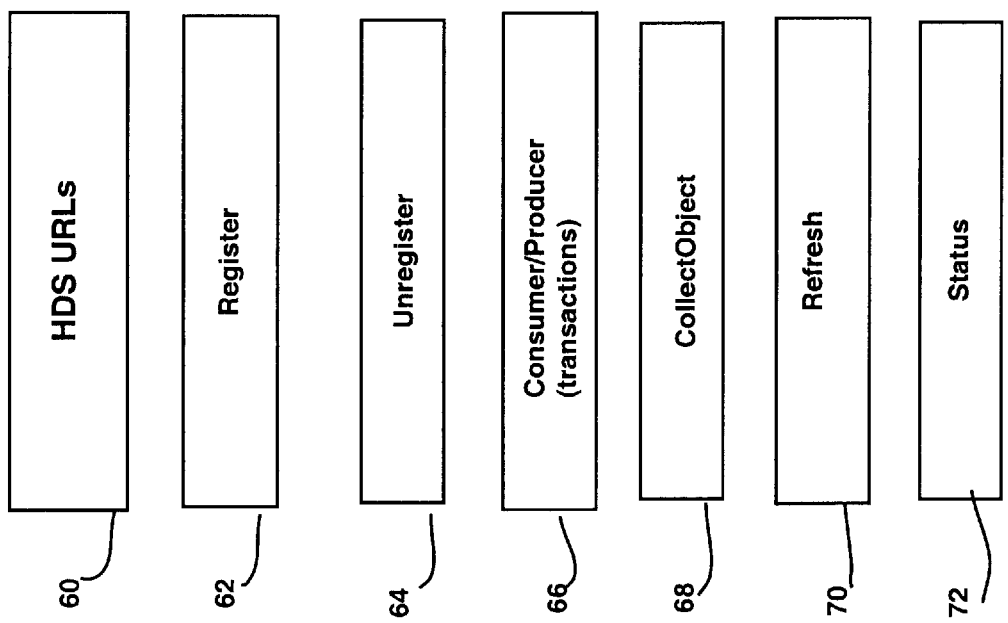
FIG. 6a is a block diagram of uniform resource locators (URL's) for a hyper domain server of the present invention.

In FIG. 6a, typical hyper domain resource locator URL's are shown. As seen here, there are URLS for Register 62 and Unregister 64, which enable the addition and deletion of firms and client domain servers CDS for them. When organized into a hyper domain server, the consumer and producer URL's can be grouped into a transactions URL 66. Similarly, other functions such as collect object 68, refresh 70 and status 72 are now part of the hyper domain URL list in this configuration.

Figure 6B:
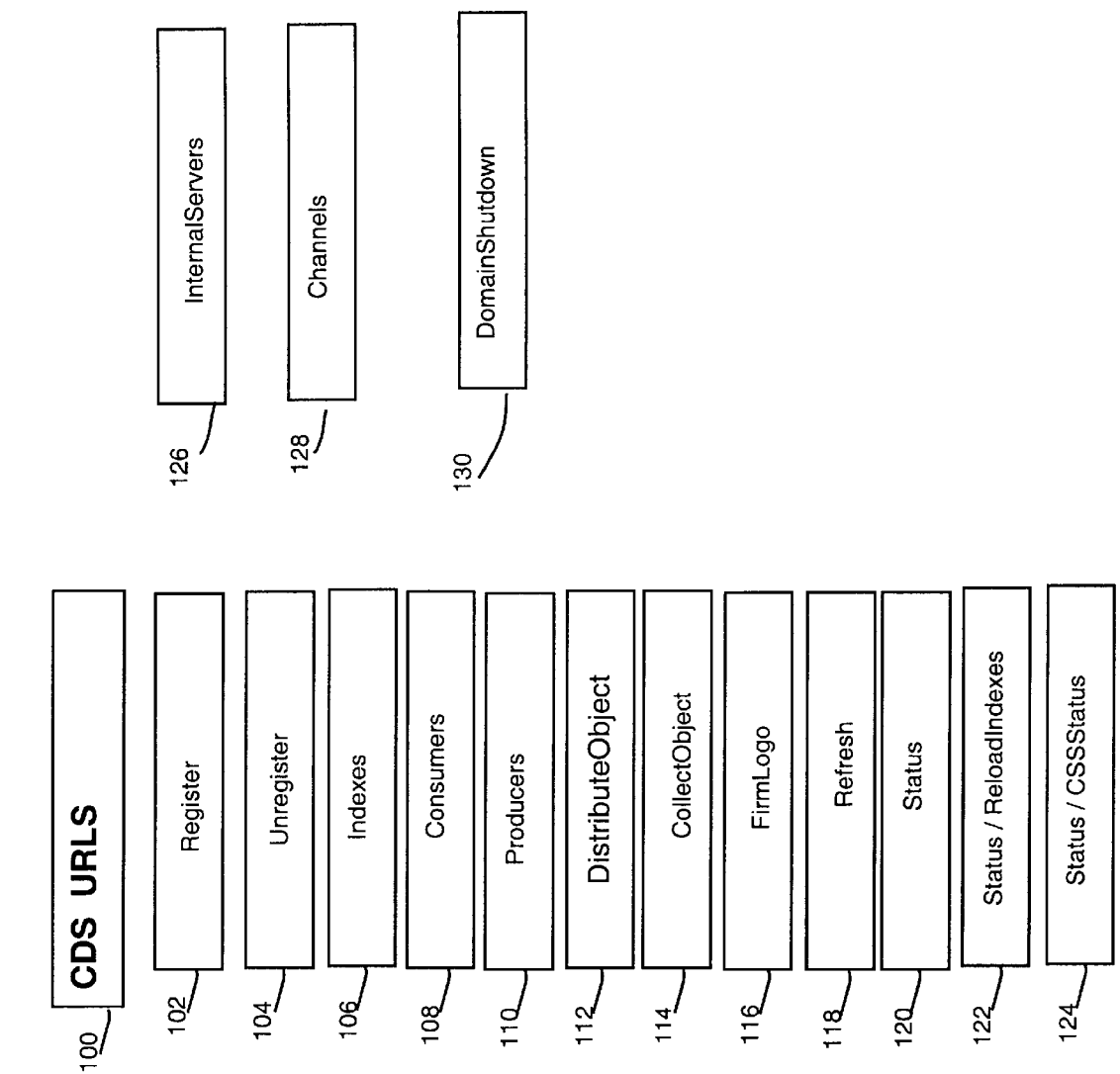
FIG. 6b is a block diagram of uniform resource locators (URL's) for a client domain server of the present invention.

Turning now to FIG. 6b, the client domain server URLs configured for a client domain server CDS configuration are essentially the original domain communications server URL's.

Finally, referring now to FIG. 6c, the client side communications server URL's would remain unchanged.

While a preferred embodiment of the present invention is implemented as a program written in the C++ programming language and operates on personal computers or workstations using the NT or Unix operating systems, as will be apparent to those skilled in the art, other programming languages and operating systems could be used. Additionally, although the preferred embodiment uses a software program implementation, it will be apparent that some or all of the logic of the present invention could also be embodied in firmware or hardware circuitry.

Those skilled in the art will appreciate that the embodiments described above are illustrative only and that other systems in the spirit of the teachings herein fall within the scope of the invention.

What is claimed is:

1. An apparatus for managing event-driven communications between different client domain servers comprising:

a first computer having electronic storage media for storing a dynamic client domain server registry thereon and for storing resource locators containing function names thereon, the first computer further comprising a web server program which, when executed by the first computer, causes the first computer to respond to the resource locators by calling the function name indicated therein into the first computer, the first computer further comprising a database management program for organizing the dynamic client domain server registry;

a hyper domain server program which, when loaded by the web server program responding to the appropriate resource locator therefor, is executed by the first computer, and is further responsive to resource locators directed to the hyper domain server program for directing the database management program in organizing the dynamic client domain server registry to map and authorize a communications infrastructure and the contents thereof;

a second computer in communications relationship with the first computer, the second computer having electronic storage media for storing a dynamic client registry thereon and for storing resource locators containing function names thereon, the second computer further comprising a web server program which, when executed by the second computer, causes the second computer to respond to resource locators by calling the function name indicated therein into the second computer, the second computer further comprising a database management program for organizing the dynamic client registry;

a client domain server program which, when loaded by the web server program responding to the appropriate resource locator therefor, is executed by the second computer, and is further responsive to resource locators directed to the client domain server program for directing the database management program in organizing the dynamic client registry to map and authorize a communications infrastructure and the contents thereof;

a hyper domain resource locator list stored in the first and second computers that causes predetermined functions to be selected for execution in the hyper domain server in the first computer;

a client domain resource locator list stored in the first and second computers that causes predetermined functions to be selected for execution in the client domain server in the second computer so that communications between the first computer and the second computer cause the selected functions to be executed dynamically in order to route contents as communication events occur according to the maps in the dynamic client domain registries and dynamic client registries so that clients can be registered and unregistered dynamically at a local client level, content can be created and deleted dynamically at a local client level, and content can be replicated dynamically at a local client level amongst internal client groups and automatically replicated externally to authorized external clients and groups, thereby enabling interactive communications amongst groups and clients.

* * * * *